United States Patent
Kato et al.

(10) Patent No.: US 11,822,009 B2
(45) Date of Patent: Nov. 21, 2023

(54) SELF-POSITION ESTIMATION DEVICE, SELF-POSITION ESTIMATION METHOD, PROGRAM, AND RECORDING MEDIUM

(71) Applicant: PIONEER CORPORATION, Tokyo (JP)

(72) Inventors: Masahiro Kato, Kawagoe (JP); Tomoaki Iwai, Kawagoe (JP); Kazufumi Fujiya, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 645 days.

(21) Appl. No.: 17/042,854

(22) PCT Filed: Mar. 26, 2019

(86) PCT No.: PCT/JP2019/012721
§ 371 (c)(1),
(2) Date: Sep. 28, 2020

(87) PCT Pub. No.: WO2019/189098
PCT Pub. Date: Oct. 3, 2019

(65) Prior Publication Data
US 2021/0025981 A1 Jan. 28, 2021

(30) Foreign Application Priority Data

Mar. 28, 2018 (JP) .................. 2018-063351

(51) Int. Cl.
*G01S 7/48* (2006.01)
*G01S 17/931* (2020.01)
*G01S 17/06* (2006.01)

(52) U.S. Cl.
CPC ............ *G01S 7/4808* (2013.01); *G01S 17/06* (2013.01); *G01S 17/931* (2020.01)

(58) Field of Classification Search
CPC ..... G01C 21/1652; G01C 21/30; G01S 17/06; G01S 17/86; G01S 7/4808; G01S 17/42;
(Continued)

(56) References Cited

U.S. PATENT DOCUMENTS 10,332,395 B1 * 6/2019 Berg .................. G01S 19/41
10,748,428 B2 * 8/2020 Park .................... G05D 1/0295
(Continued)

FOREIGN PATENT DOCUMENTS

JP H09-178482 A 7/1997
JP 2008249639 A 10/2008
(Continued)

OTHER PUBLICATIONS

International Search Report for related JP App. No. PCT/JP2019/012721 dated Jun. 25, 2019; 3 pages.
(Continued)

*Primary Examiner* — An H Do
(74) *Attorney, Agent, or Firm* — Procopio, Cory, Hargreaves & Savitch LLP

(57) ABSTRACT

A self-position estimation device is mounted on a mobile body and acquires a predicted position of the mobile body. Additionally, the self-position estimation device calculates a difference value between a predicted position of an end point of a lane division line that is obtained based on information on the end point of the lane division line acquired from map information and a measured position of the end point of the lane division line measured in such a manner that a measurement unit mounted on the mobile body performs scanning with a light in a predetermined direction. The self-position estimation device estimates a self-position of the mobile body by correcting the predicted position with a value obtained by multiplying the difference value by a coefficient. Further, the self-position estimation device cor-
(Continued)

rects the coefficient based on an interval of scanning positions of the measurement unit at a position where the end point of the lane division line is detected.

8 Claims, 13 Drawing Sheets

(58) Field of Classification Search
CPC ... G01S 7/4802; G01S 17/931; G06V 20/588; G06V 2201/10
See application file for complete search history.

(56) References Cited

U.S. PATENT DOCUMENTS

| | | | |
|---|---|---|---|
| 11,243,534 B2* | 2/2022 | Nagata | G01C 21/3446 |
| 11,454,514 B2* | 9/2022 | Niihara | G01S 17/86 |
| 11,512,962 B2* | 11/2022 | Kato | G01C 21/30 |
| 11,519,736 B2* | 12/2022 | Fujiya | G01C 21/3602 |
| 2004/0036586 A1 | 2/2004 | Harooni | |
| 2016/0063858 A1 | 3/2016 | Schmudderich et al. | |
| 2016/0358477 A1 | 12/2016 | Ansari | |

FOREIGN PATENT DOCUMENTS

| | | |
|---|---|---|
| JP | 2013257742 A | 12/2013 |
| JP | 2017072422 A | 4/2017 |
| JP | 2018025490 A | 2/2018 |

OTHER PUBLICATIONS

European Patent Office, European Search Report, Application No. 19777416.9 dated Dec. 2, 2021 in 9 pages.

* cited by examiner

FIG.9
<DETECTION OF END POINT OF STARTING PART OF WHITE LINE>
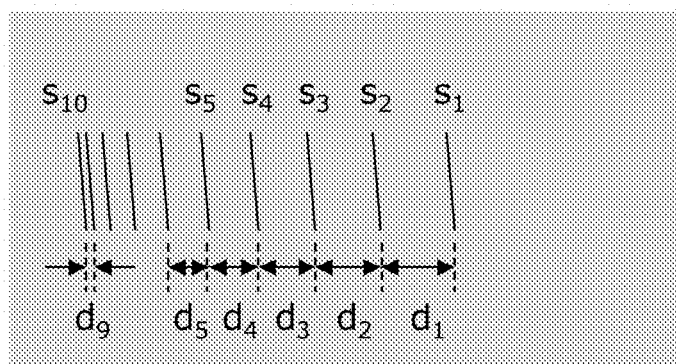
(EXAMPLE 1) CHANGE IN REFLECTION INTENSITY BETWEEN SCAN LINES $s_2$ AND $s_3$
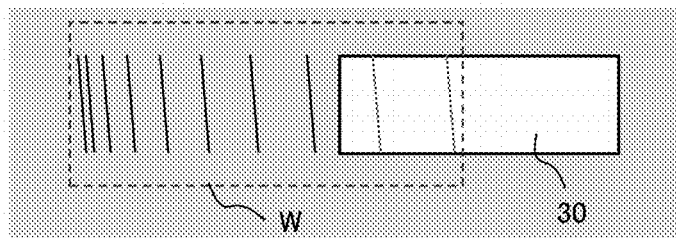
(EXAMPLE 2) CHANGE IN REFLECTION INTENSITY BETWEEN SCAN LINES $s_4$ AND $s_5$
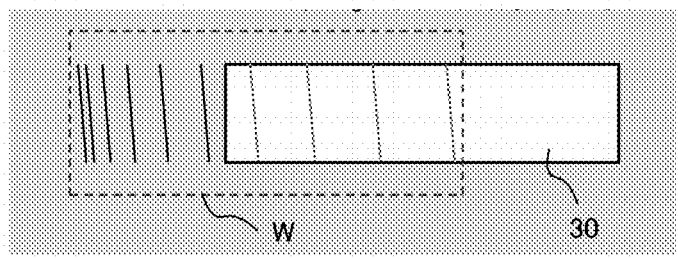
(EXAMPLE 3) CHANGE IN REFLECTION INTENSITY BETWEEN SCAN LINES $s_7$ AND $s_8$
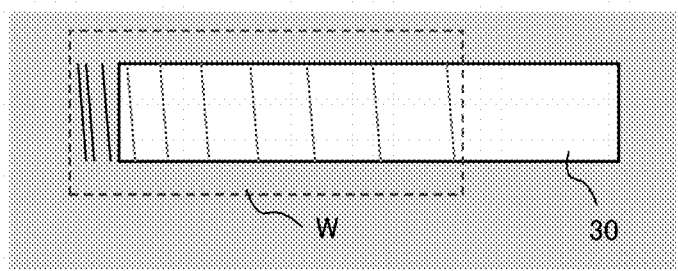

FIG.10
<DETECTION OF END POINT OF TERMINATION PART OF WHITE LINE>
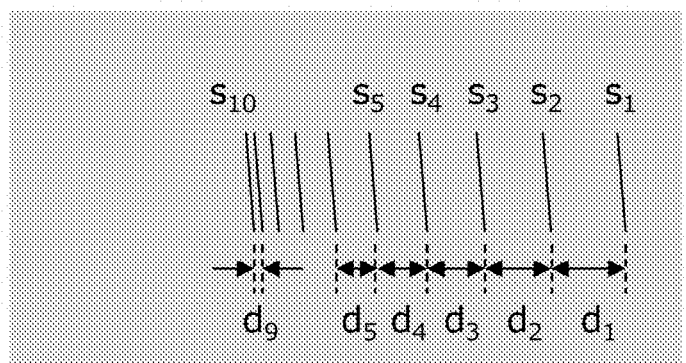
(EXAMPLE 4) CHANGE IN REFLECTION INTENSITY BETWEEN SCAN LINES $s_2$ AND $s_3$
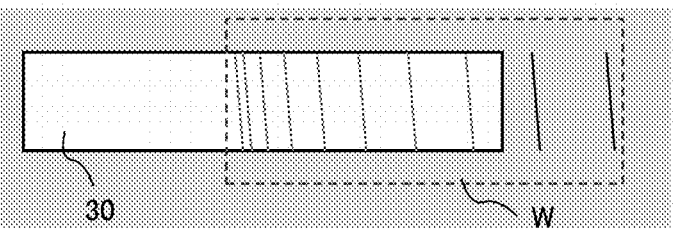
(EXAMPLE 5) CHANGE IN REFLECTION INTENSITY BETWEEN SCAN LINES $s_4$ AND $s_5$
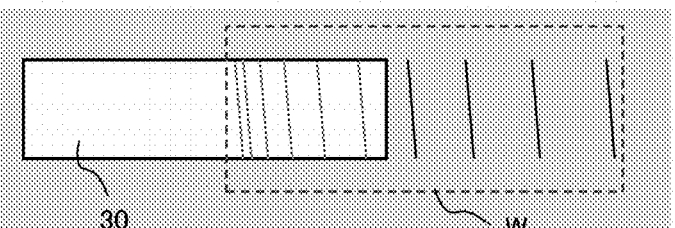
(EXAMPLE 6) CHANGE IN REFLECTION INTENSITY BETWEEN SCAN LINES $s_7$ AND $s_8$
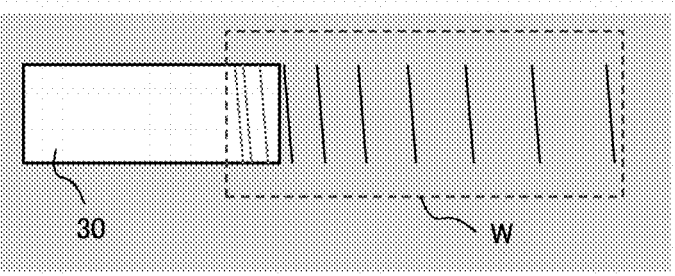

FIG.11
<CASE WHERE REFLECTION INTENSITY IS CHANGED IN MIDDLE OF SCAN LINE>
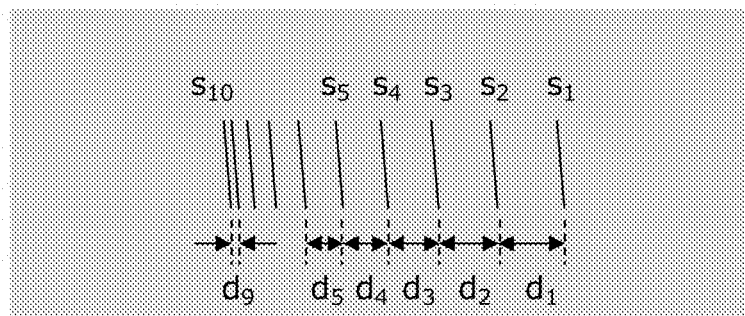
(EXAMPLE 7) CHANGE IN REFLECTION INTENSITY IN MIDDLE OF SCAN LINE $s_3$
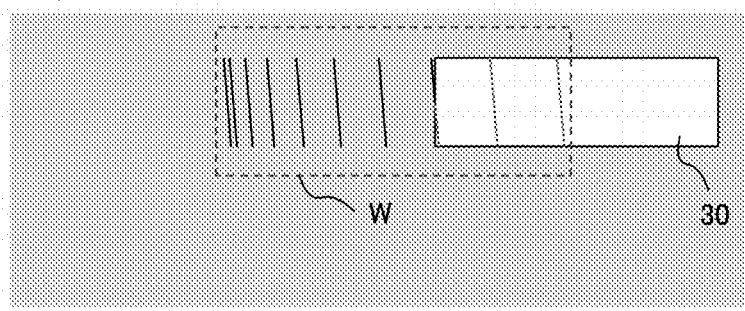
(EXAMPLE 8) CHANGE IN REFLECTION INTENSITY IN MIDDLE OF SCAN LINE $s_3$
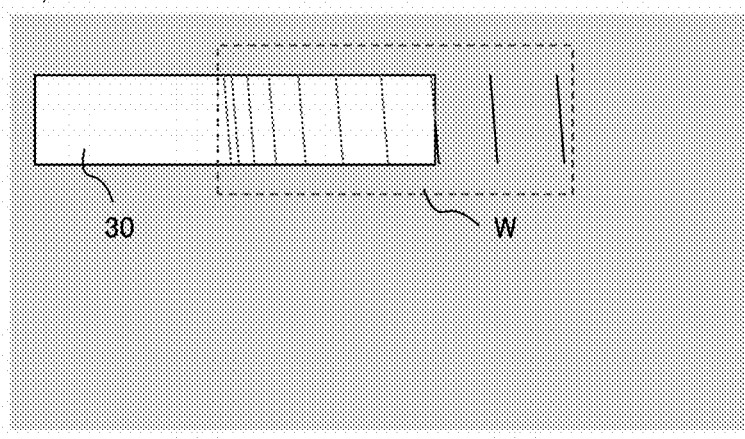

$\bar{x}(t)$  $\bar{y}(t)$ : ESTIMATED OWN-VEHICLE POSITION (WORLD COORDINATE)

$\bar{\psi}(t)$ : ESTIMATED OWN-VEHICLE AZIMUTH (WORLD COORDINATE)

$m_x(k)$  $m_y(k)$ : COORDINATES OF WHITE LINE END POINT k (WORLD COORDINATE)

$\bar{L}_x(t)$  $\bar{L}_y(t)$ : LANDMARK PREDICTION VALUE OF WHITE LINE END POINT k
(VEHICLE COORDINATE)

FIG.13A

<CASE WHERE END POINT IS DETECTED>

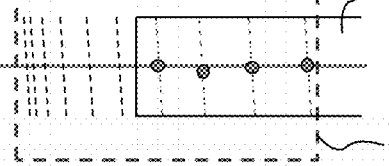

TRAVELING-DIRECTION COEFFICIENT : $a(t) = \dfrac{1}{d(t)}$ $d(t)$ : LINE INTERVAL AT POSITION WHERE CHANGE IN REFLECTION INTENSITY IS DETECTED LATERAL-DIRECTION COEFFICIENT : $b(t) = \dfrac{N_L(t)}{N_M}$ $N_L(t)$ : NUMBER OF SCAN LINES MEASURED BY LIDAR
$N_M$ : NUMBER OF SCAN LINES PRESENT IN WINDOW

FIG.13B

<CASE WHERE END POINT IS NOT DETECTED>

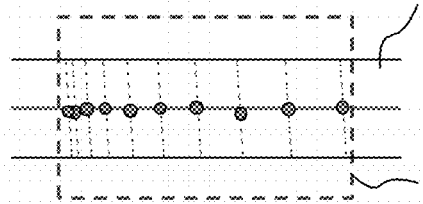

TRAVELING-DIRECTION COEFFICIENT : $a(t) = 0$

LATERAL-DIRECTION COEFFICIENT : $b(t) = 1$

FIG.14A

<CASE WHERE END POINT IS DETECTED>

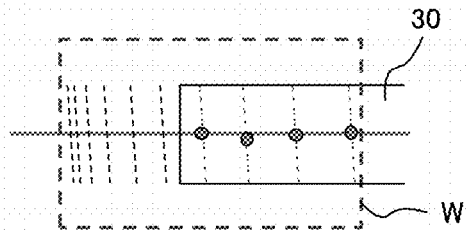

TRAVELING-DIRECTION COEFFICIENT : $a(t) = \dfrac{d(t)}{d_q}$ $d(t)$ : LINE INTERVAL AT POSITION WHERE CHANGE IN REFLECTION INTENSITY IS DETECTED LATERAL-DIRECTION COEFFICIENT : $b(t) = \dfrac{N_M}{N_L(t)}$ $N_L(t)$ : NUMBER OF SCAN LINES MEASURED BY LIDAR
$N_M$ : NUMBER OF SCAN LINES PRESENT IN WINDOW

FIG.14B

<CASE WHERE END POINT IS NOT DETECTED>

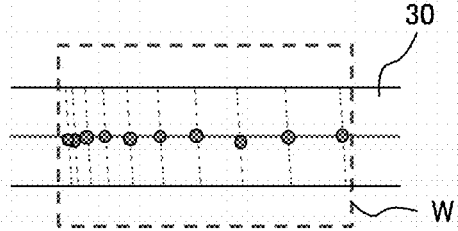

TRAVELING-DIRECTION COEFFICIENT : $a(t) = 10000$

LATERAL-DIRECTION COEFFICIENT : $b(t) = 1$

SELF-POSITION ESTIMATION DEVICE, SELF-POSITION ESTIMATION METHOD, PROGRAM, AND RECORDING MEDIUM

CROSS-REFERENCE TO RELATED APPLICATIONS

This application is a U.S. National Stage entry of PCT Application No. PCT/JP2019/012721, filed on Mar. 26, 2019, which claims priority to JP Application No. 2018-063351, filed Mar. 28, 2018. The contents of the foregoing are incorporated by reference.

TECHNICAL FIELD

The present invention relates to a self-position estimation technology.

BACKGROUND TECHNIQUE

A technology that detects ground objects installed on a traveling route of a vehicle by using a radar and a camera and corrects an own-vehicle position based on a result of the detection has been known. For example, Patent Reference 1 discloses a technology that collates an output of a measurement sensor and positional information of a ground object previously registered in a map, to estimate a self-position. Further, Patent Reference 2 discloses an own-vehicle position estimation technology using a Kalman filter.

PRIOR ART REFERENCES

Patent References

Patent Reference 1: Japanese Patent Laid-Open No. 2013-257742
Patent Reference 2: Japanese Patent Laid-Open No. 2017-72422

SUMMARY OF THE INVENTION

Problem to be Solved by the Invention

In a case where a continuously-provided structure such as a white line, a curbstone, and a guardrail is measured in the self-position estimation based on a Bayesian method disclosed in Patent Reference 2, a distance in a lateral direction viewed from the own vehicle can be measured, but a distance in a traveling direction cannot be accurately specified due to continuity in the traveling direction. In addition, in a case of a lane division line in a dashed line shape, a length of the lane division line to be detected in a front-rear direction is changed. Therefore, the position in the traveling direction cannot be accurately specified similarly.

The present invention is made to solve the above-described issues, and an object of the present invention is to provide a self-position estimation device that handles a lane division line such as a white line as a measurement target, and makes it possible to perform position estimation not only in a lateral direction but also in a traveling direction with high accuracy.

Means for Solving the Problem

An invention according to claims is a self-position estimation device mounted on a mobile body comprising: an acquisition unit configured to acquire a predicted position of the mobile body; a difference value calculation unit configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and an estimation unit configured to estimate a self-position of the mobile body by correcting the predicted position of the mobile body with a value obtained by multiplying the difference value by a coefficient, wherein the estimation unit corrects the coefficient based on an interval of scanning positions of the measurement unit at a position where the end point of the lane division line is detected.

Another invention according to claims is a self-position estimation method performed by a self-position estimation device mounted on a mobile body, the method comprising: an acquisition process configured to acquire a predicted position of the mobile body; a difference value calculation process configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and an estimation process configured to estimate a self-position of the mobile body by correcting the predicted position of the mobile body with a value obtained by multiplying the difference value by a coefficient, wherein the estimation process corrects the coefficient based on an interval of scanning positions of the measurement unit at a position where the end point of the lane division line is detected.

Still another invention according to claims is a program executed by a self-position estimation device that is mounted on a mobile body and includes a computer, the program causing the computer to function as: an acquisition unit configured to acquire a predicted position of the mobile body; a difference value calculation unit configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and an estimation unit configured to estimate a self-position of the mobile body by correcting the predicted position of the mobile body with a value obtained by multiplying the difference value by a coefficient, wherein the estimation unit corrects the coefficient based on an interval of scanning positions of the measurement unit at a position where the end point of the lane division line is detected.

BRIEF DESCRIPTION OF THE DRAWINGS

FIG. 9 is a diagram illustrating a method of detecting a position of an end point at a starting part of a white line.

FIG. 10 is a diagram illustrating a method of detecting a position of an end point at a termination part of the white line.

FIG. 11 is a diagram illustrating a method of determining the position of the end point in a case where reflection intensity is changed in middle of a scan line.

FIGS. 13A and 13B are diagrams illustrating correction coefficients of a Kalman gain.

FIGS. 14A and 14B are diagrams illustrating correction coefficients of measurement noise.

DETAILED DESCRIPTION OF THE PREFERRED EMBODIMENTS

Figure 1:
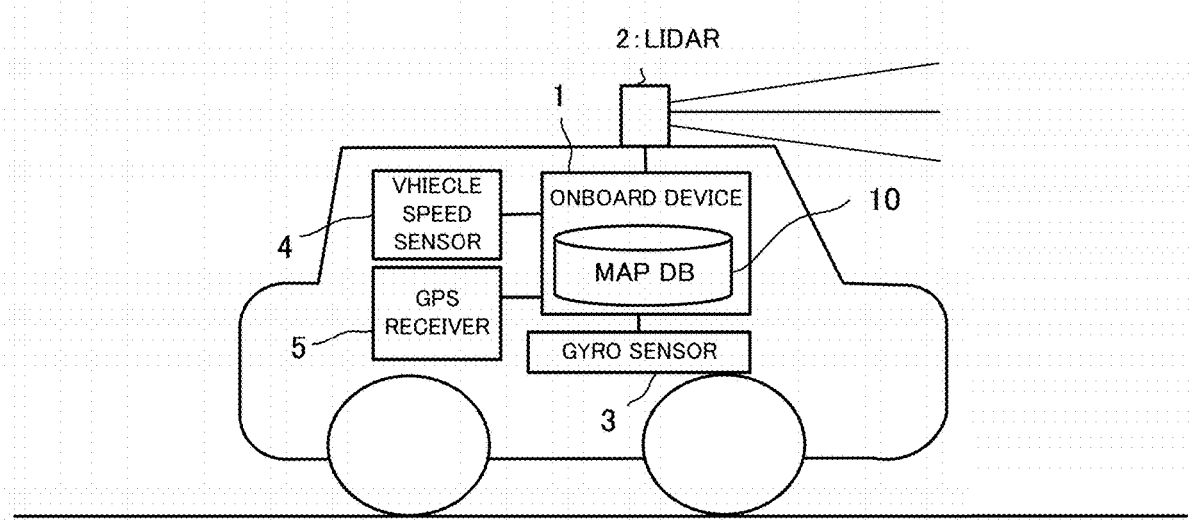
FIG. 1 is a schematic configuration diagram of a driving support system.

According to one aspect of the present invention, there is provided a self-position estimation device mounted on a mobile body, comprising: an acquisition unit configured to acquire a predicted position of the mobile body; a difference value calculation unit configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and an estimation unit configured to estimate a self-position of the mobile body by correcting the predicted position of the mobile body with a value obtained by multiplying the difference value by a coefficient, wherein the estimation unit corrects the coefficient based on an interval of scanning positions of the measurement unit at a position where the end point of the lane division line is detected.

The above-described self-position estimation device is mounted on the mobile body and acquires the predicted position of the mobile body. The self-position estimation device calculates the difference value between the predicted position of the end point of the lane division line that is obtained based on the information on the end point of the lane division line acquired from the map information and the measured position of the end point of the lane division line measured in such a manner that the measurement unit mounted on the mobile body performs scanning with a light in a predetermined direction, and estimates the self-position of the mobile body by correcting the predicted position of the mobile body with the value obtained by multiplying the difference value by the coefficient. Then, the self-position estimation device corrects the coefficient based on the interval of the scanning positions of the measurement unit at the position where the end point of the lane division line is detected. According to the self-position estimation device, it is possible to enhance estimation accuracy of the self-position in the traveling direction of the mobile body by using the position of the end point of the lane division line. In a preferred example, the coefficient is a Kalman gain.

In one mode of the above-described self-position estimation device, the estimation unit corrects the coefficient with an inverse number of the interval of the scanning positions. In another mode, the estimation unit corrects the coefficient based on a ratio of the interval of the scanning positions and a shortest interval of the scanning positions measured by the measurement unit among intervals of the scanning positions. In this mode, the coefficient is corrected such that the difference value is largely reflected in the self-position estimation as the interval of the scanning positions is smaller.

In still another mode of the above-described self-position estimation device, the measurement unit detects a lane division line existing in a window that is defined at a predetermined position with a position of the mobile body as a reference, and the estimation unit corrects the coefficient based on a ratio of number of scan lines existing on the lane division line and number of scan lines previously determined based on a size of the window. In this mode, the coefficient is corrected such that the difference value is largely reflected in the self-position estimation as the number of scan lines existing on the detected lane division line is larger.

In still another mode of the above-described self-position estimation device, the measurement unit detects a middle point between a scan line existing on the lane division line and a scan line not existing on the lane division line as the end point of the lane division line. The scan line existing on the lane division line and the scan line not existing on the lane division line are adjacent to each other. This makes it possible to determine the end point of the lane division line from a position of the scan line existing on the lane division line and a position of the scan line not existing on the lane division line.

According to another aspect of the present invention, there is provided a self-position estimation method performed by a self-position estimation device mounted on a mobile body, the method comprising: an acquisition process configured to acquire a predicted position of the mobile body; a difference value calculation process configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and an estimation process configured to estimate a self-position of the mobile body by correcting the predicted position of the mobile body with a value obtained by multiplying the difference value by a coefficient, wherein the estimation process corrects the coefficient based on an interval of scanning positions of the measurement unit at a position where the end point of the lane division line is detected. According to the self-position estimation method, it is possible to enhance estimation accuracy of the self-position in the traveling direction of the mobile body by using the position of the end point of the lane division line.

According to still another aspect of the present invention, there is provided a program executed by a self-position estimation device that is mounted on a mobile body and includes a computer, the program causing the computer to function as: an acquisition unit configured to acquire a predicted position of the mobile body; a difference value calculation unit configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and an estimation unit configured to estimate a self-position of the mobile body by correcting the predicted position of the mobile body with a value obtained by multiplying the difference value by a coefficient, wherein the estimation unit corrects the coefficient based on an interval of scanning positions of the measurement unit at a position where the end point of the lane division line is detected. By executing the program by the computer, the above-described self-position estimation device can be realized. The program can be handled by being stored in a recording medium.

EMBODIMENTS

A preferred embodiment of the present invention is described below with reference to drawings. Note that a character in which a symbol "^" or "-" is added above an optional character is expressed by "A^" or "A—" ("A" is optional character) for convenience in the present specification.
[Driving Support System]

FIG. 1 is a schematic configuration diagram of a driving support system according to the present embodiment. The driving support system illustrated in FIG. 1 includes an onboard device 1 that is mounted on a vehicle and performs control relating to driving support of the vehicle, a lidar (light detection and ranging, or laser illuminated detection and ranging) 2, a gyro sensor 3, a vehicle speed sensor 4, and a GPS receiver 5.

The onboard device 1 is electrically connected to the lidars 2, the gyro sensor 3, the vehicle speed sensor 4, and the GPS receiver 5, and estimates a position of a vehicle (also referred to as "own-vehicle position") on which the onboard device 1 is mounted, based on outputs from the lidars 2, the gyro sensor 3, the vehicle speed sensor 4, and the GPS receiver 5. Further, the onboard device 1 performs automatic driving control and the like of the vehicle such that the vehicle travels along a route to a set destination based on a result of the estimation of the own-vehicle position. The onboard device 1 stores a map database (DB) 10 in which road data and information about landmark ground objects and lane division lines provided near a road are registered. Examples of the above-described landmark ground objects include kilometer posts, 100-meter posts, delineators, traffic infrastructure facilities (e.g., traffic signs, destination boards, and signals), telephone poles, and streetlights, periodically arranged along the road. The onboard device 1 collates the outputs from the lidars 2 with the map DB 10 to estimate the own-vehicle position. The onboard device 1 is an example of a "self-position estimation device" in the present invention.

Each of the lidars 2 emit a pulse laser to a predetermined angle range in a horizontal direction and a vertical direction to discretely measure a distance to an object existing outside, and generates three-dimensional point group information representing a position of the object. In this case, each of the lidar 2 includes an irradiation unit, a light reception unit, and an output unit. The irradiation unit performs irradiation with a laser beam while changing an irradiation direction. The light reception unit receives reflected light (scattered light) of the irradiated laser beam. The output unit outputs scan data based on a light reception signal output from the light reception unit. In the present embodiment, an irradiation range of the laser emitted by the lidar 2 includes at least a road surface of the road. The scan data is generated based on the irradiation direction corresponding to the laser beam received by the light reception unit and a distance to the object in the irradiation direction of the laser beam. The distance to the object is specified based on the above-described light reception signal. Generally, accuracy of the distance measurement value by the lidar is higher as the distance to the object is smaller, and the accuracy is lower as the distance is larger. The lidars 2, the gyro sensor 3, the vehicle speed sensor 4, and the GPS receiver 5 each supply output data to the onboard device 1. The lidar 2 is example of a "measurement unit" in the present invention.

Figure 2:
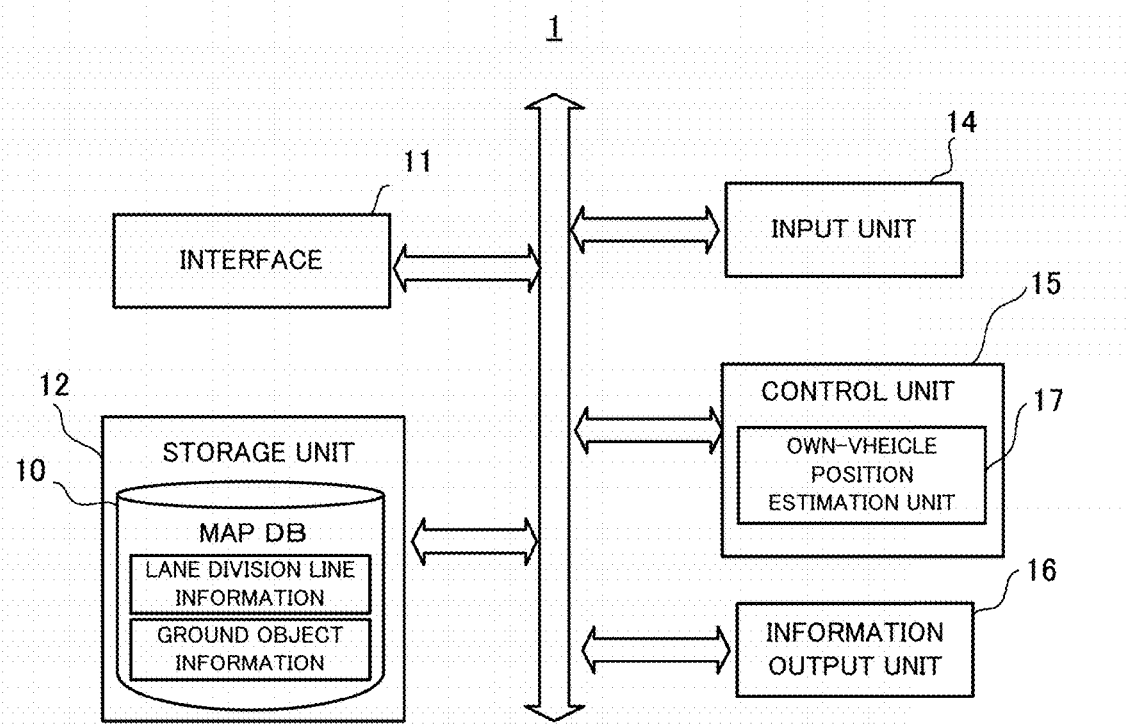
FIG. 2 is a block diagram illustrating a functional configuration of an onboard device.

FIG. 2 is a block diagram illustrating a functional configuration of the onboard device 1. The onboard device 1 mainly includes an interface 11, a storage unit 12, an input unit 14, a control unit 15, and an information output unit 16. These elements are connected to one another through a bus line.

The interface 11 acquires the output data from the sensors such as the lidar 2, the gyro sensor 3, the vehicle speed sensor 4, and the GPS receiver 5, and supplies the output data to the control unit 15.

The storage unit 12 stores programs to be executed by the control unit 15, and information necessary for the control unit 15 to perform predetermined processing. In the present embodiment, the storage unit 12 stores the map DB 10 including lane division line information and ground object information. The lane division line information is information about a lane division line (white line) provided in each road, and includes coordinate information representing a discrete position of each lane division line. Note that the lane division line information may be information incorporated in the road data of each road. Further, in the present embodiment, as for a lane division line of a dashed line, the lane division line information includes coordinate information representing positions of end points of the lane division line. The ground object information is information about a ground object other than the lane division line. In this example, at least ground object ID corresponding to an index of a ground object and positional information that indicates an absolute position of the ground object represented by latitude, longitude, (and altitude), etc. are associated with each other for each ground object. Note that the map DB 10 may be periodically updated. In this case, for example, the control unit 15 receives partial map information about an area to which the own-vehicle position belongs, from a server apparatus managing the map information through an unillustrated communication unit, and reflects the partial map information in the map DB 10.

The input unit 14 includes a button, a touch panel, a remote controller, an audio input device, and the like operated by a user. The information output unit 16 includes, for example, a display and a speaker that perform output based on control by the control unit 15.

The control unit 15 includes a CPU executing a program, etc., and controls the whole of the onboard device 1. In the present embodiment, the control unit 15 includes an own-vehicle position estimation unit 17. The control unit 15 is an example of an acquisition unit, a difference value calculation unit, and an estimation unit in the present invention.

The own-vehicle position estimation unit 17 corrects the own-vehicle position estimated from the output data of the gyro sensor 3, the vehicle speed sensor 4, and/or the GPS receiver 5, based on the measurement values of the distance and the angle of a landmark by the lidar 2 and the positional information on the landmark extracted from the map DB 10. In the present embodiment, as an example, the own-vehicle position estimation unit 17 alternately performs a prediction step of predicting the own-vehicle position from the output data of the gyro sensor 3, the vehicle speed sensor 4, and the like based on a state estimation method based on Bayesian estimation and a measurement update step of correcting a predicted value of the own-vehicle position calculated in the immediately preceding prediction step. As a state estimation filter used in these steps, various filters developed for Bayesian estimation are usable, and examples of the state estimation filter include an extended Kalman filter, an unscented Kalman filter, and a particle filter. As described above, various methods are proposed as the position estimation method based on Bayesian estimation.

In the following, the own-vehicle position estimation using the extended Kalman filter is briefly described. As described below, in the present embodiment, even in a case of the own-vehicle position estimation based on any of the ground objects and the lane division lines, the own-vehicle position estimation unit 17 consistently performs the own-vehicle position estimation processing using the extended Kalman filter.

Figure 3:
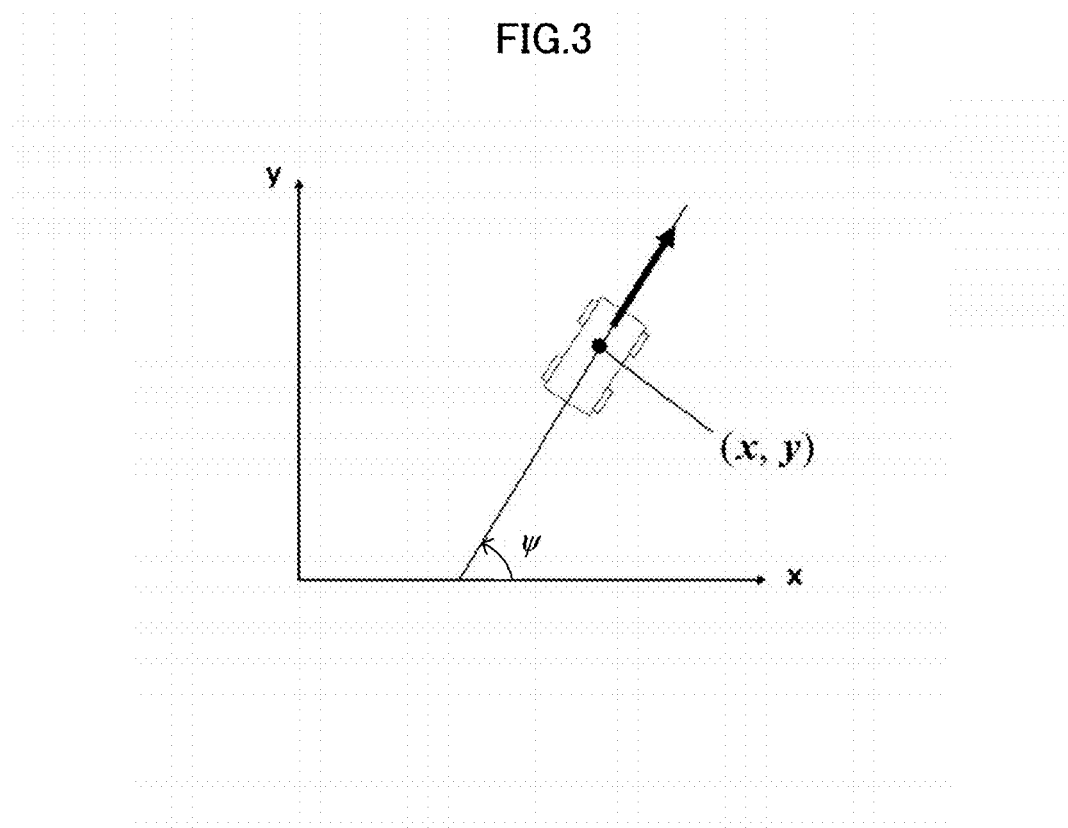
FIG. 3 is a diagram illustrating a state variable vector in a two-dimensional orthogonal coordinate system.

FIG. 3 is a diagram illustrating a state variable vector x in a two-dimensional orthogonal coordinate system. As illustrated in FIG. 3, the own-vehicle position on a plane defined in the two-dimensional orthogonal coordinate of x and y is represented by coordinates "(x, y)" and an azimuth of own vehicle "Ψ". The azimuth Ψ is defined as an angle formed by the traveling direction of the vehicle and the x-axis. The coordinates (x, y) represent an absolute position in a coordinate system that has a certain reference position as an origin, corresponding to, for example, a combination of latitude and longitude.

Figure 4:
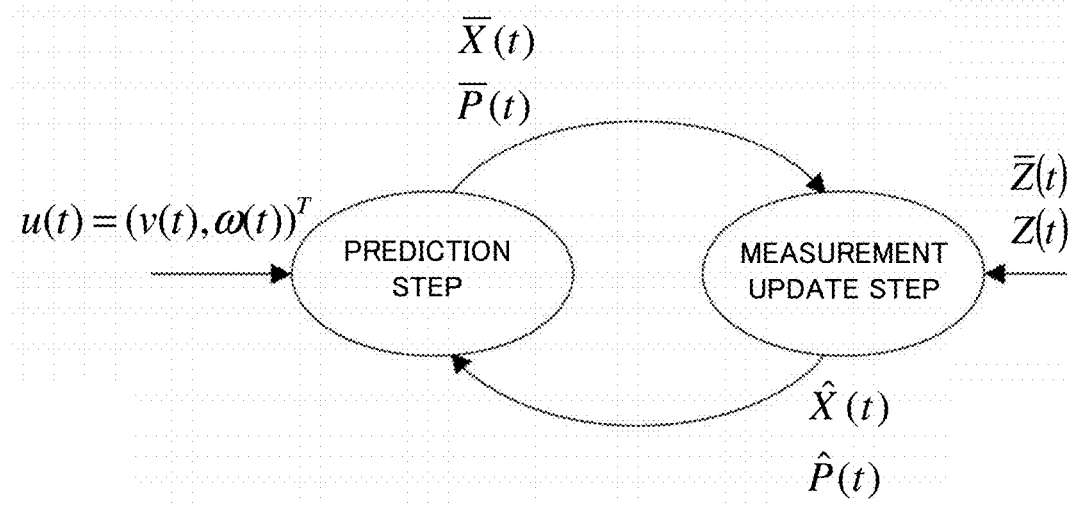
FIG. 4 is a diagram illustrating schematic relationship between a prediction step and a measurement update step.
Figure 5:
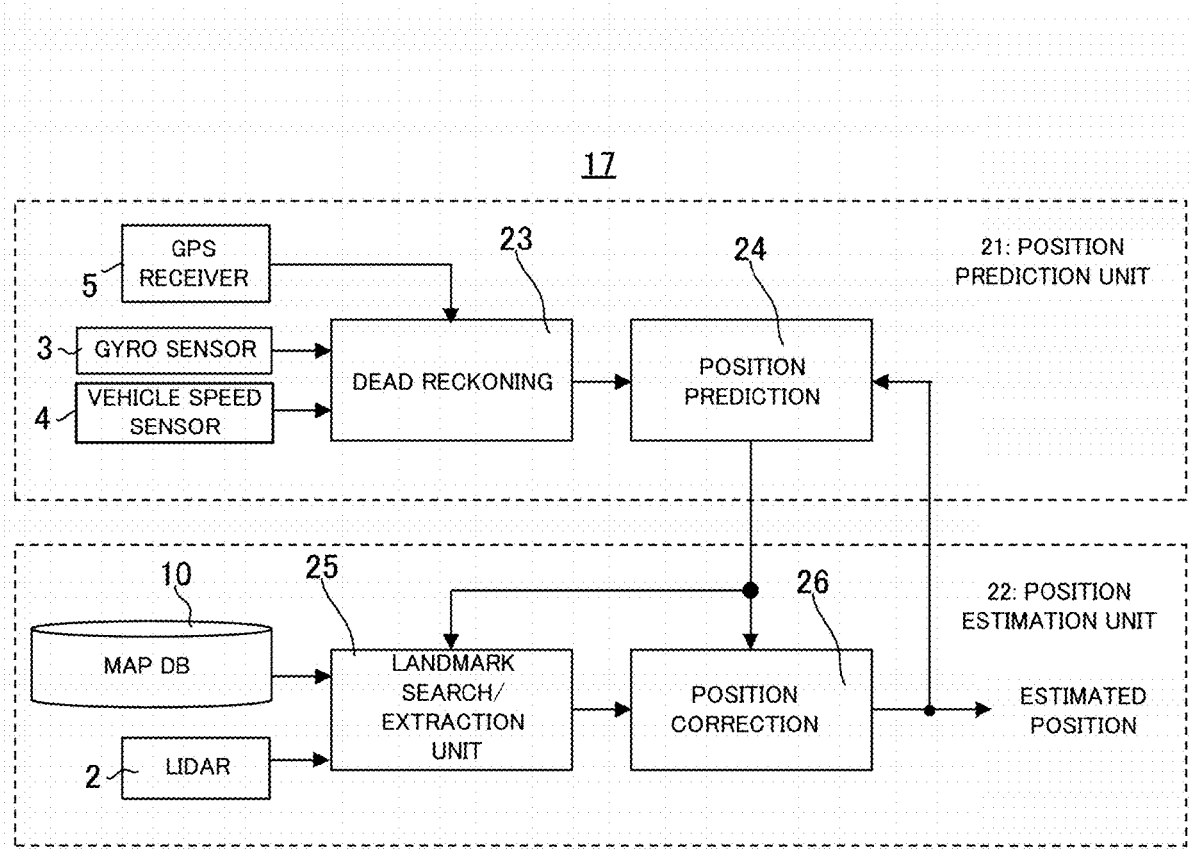
FIG. 5 is a diagram illustrating functional blocks of an own-vehicle position estimation unit.

FIG. 4 is a diagram illustrating schematic relationship between the prediction step and the measurement update step. In addition, FIG. 5 illustrates exemplary functional blocks of the own-vehicle position estimation unit 17. As illustrated in FIG. 4, the prediction step and the measurement update step are repeated to successively perform calculation and update of the estimated value of a state variable vector "X" representing the own-vehicle position. Further, as illustrated in FIG. 5, the own-vehicle position estimation unit 17 includes a position prediction unit 21 performing the prediction step, and a position estimation unit 22 performing the measurement update step. The position prediction unit 21 includes a dead reckoning block 23 and a position prediction block 24. The position estimation unit 22 includes a landmark search/extraction unit 25 and a position correction block 26. Note that, in FIG. 4, the state variable vector at a reference time (i.e., current time) "t" to be calculated is expressed by "X⁻(t)" or "X^(t)". The state variable vector is expressed as "state variable vector X(t)= $(x(t), y(t), \psi(t))^T$". In this example, a tentative estimated value (predicted value) estimated in the prediction step is added with a symbol "⁻" above a character representing the predicted value, and an estimated value with higher accuracy updated in the measurement update step is added with a symbol "^" above the character representing the value.

In the prediction step, the dead reckoning block 23 of the own-vehicle position estimation unit 17 determines a moving distance and azimuth change from a preceding time by using a moving speed "v" and an angular velocity "ω" of the vehicle (these are collectively expressed by "control value $u(t)=(v(t), \omega(t))^T$"). The position prediction block 24 of the own-vehicle position estimation unit 17 adds the determined moving distance and the determined azimuth change to the state variable vector X^(t−1) at the time t−1 calculated in the immediately preceding measurement update step, thereby calculating the predicted value of the own-vehicle position (also referred to as "predicted own-vehicle position") X⁻(t) at the time t. In addition, at the same time, the position prediction block 24 of the own-vehicle position estimation unit 17 calculates a covariance matrix "P⁻(t)" corresponding to error distribution of the predicted own-vehicle position X⁻(t), from a covariance matrix "P^(t−1)" at the time t−1 calculated in the immediately preceding measurement update step.

In the measurement update step, the landmark search/extraction unit 25 of the own-vehicle position estimation unit 17 associates the position vector of the landmark registered in the map DB 10 with the scan data of the lidars 2. Further, in a case where the association is performable, the landmark search/extraction unit 25 of the own-vehicle position estimation unit 17 acquires a measurement value of the associated landmark (referred to as "landmark measurement value") "Z(t)" by the lidars 2 and an estimated measurement value of the landmark (referred to as "landmark prediction value") "Z⁻(t)". The landmark prediction value Z⁻(t) is obtained by modeling the measurement processing by the lidars 2 using the predicted own-vehicle position X⁻(t) and the position vector of the landmark registered in the map DB 10. The landmark measurement value Z(t) is a two-dimensional vector in a vehicle body coordinate system that is obtained by converting the distance and the scan angle of the landmark measured by the lidars 2 at the time t into components in the traveling direction and the lateral direction of the vehicle. The position correction block 26 of the own-vehicle position estimation unit 17 calculates a difference value between the landmark measurement value Z(t) and the landmark prediction value Z⁻(t) as expressed by the following expression (1).

$$Z(t) - \bar{Z}(t) = \begin{bmatrix} dx \\ dy \end{bmatrix} \quad (1)$$

As expressed by the following expression (2), the position correction block 26 of the own-vehicle position estimation unit 17 multiplies the difference value between the landmark measurement value Z(t) and the landmark prediction value Z⁻(t) by a Kalman gain "K(t)", and adds the result of the multiplication to the predicted own-vehicle position X⁻(t), thereby calculating an updated state variable vector (also referred to as "estimated own-vehicle position") X^(t).

$$\hat{X}(t) = \bar{X}(t) + K(t)\{Z(t) - \bar{Z}(t)\} \quad (2)$$

Further, in the measurement update step, the position correction block 26 of the own-vehicle position estimation unit 17 determines a covariance matrix P^(t) (also simply referred to as P(t)) corresponding to the error distribution of the estimated own-vehicle position X^(t), from the covariance matrix P⁻(t), in a manner similar to the prediction step. The parameters such as the Kalman gain K(t) can be calculated in a manner similar to, for example, a well-known self-position estimation technology using the extended Kalman filter.

As described above, the prediction step and the measurement update step are repeatedly performed, and the predicted own-vehicle position X⁻(t) and the estimated own-vehicle position X^(t) are successively calculated. As a result, the most probable own-vehicle position is calculated.

[Own-Vehicle Position Estimation Using Lane Division Line]

Next, the own-vehicle position estimation using the lane division lines, that is characteristic in the present embodiment, is described. In the present embodiment, the own-vehicle position estimation is performed using the lane division lines as landmarks. Note that, in the following description, an example in which white lines are used as the lane division lines is described. However, the own-vehicle position estimation is similarly applicable to yellow lane division lines.

(1) Measurement of White Line by Lidar

First, a method of measuring the white line by the lidar is described.

(Measurement Value by Lidar)

Figure 6:
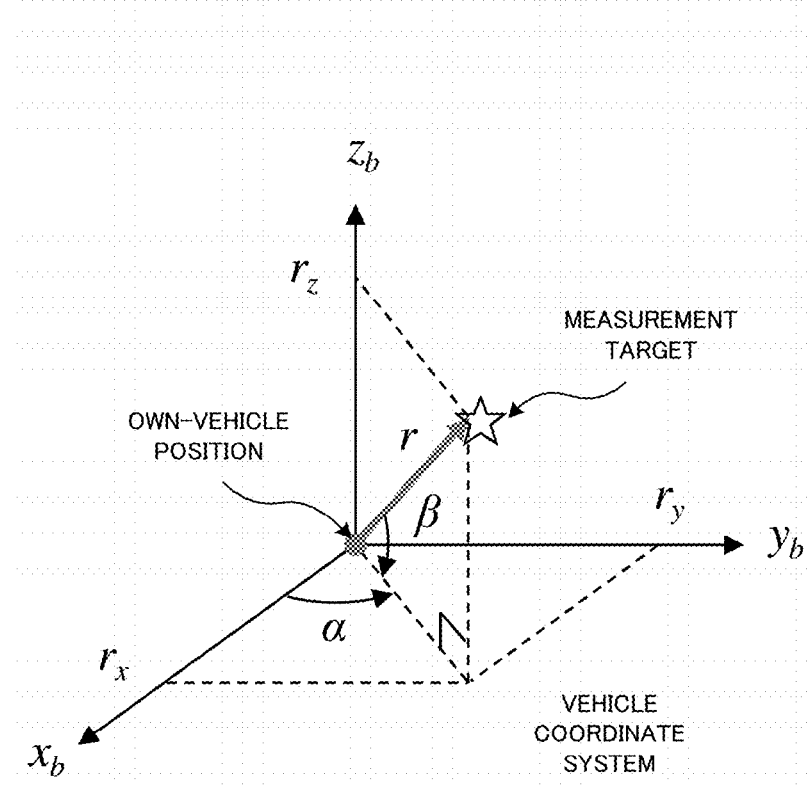
FIG. 6 is a diagram illustrating a method of converting a lidar measurement value into a value in a Cartesian coordinate system.

As illustrated in FIG. 6, a Cartesian coordinate system (hereinafter, referred to as "vehicle coordinate system") in which an own-vehicle position of a vehicle is handled as an origin and the traveling direction of the vehicle is represented in the x-axis is considered. The measurement value to a measurement target by the lidar includes a horizontal angle α, a vertical angle β, and a distance r. When these values are converted into values in the Cartesian coordinate system, the measurement value by the lidar is expressed by the following expression.

$$Z(i) = \begin{bmatrix} r_x(i) \\ r_y(i) \\ r_z(i) \end{bmatrix} = \begin{bmatrix} r(i)\cos\beta(i)\cos\alpha(i) \\ r(i)\cos\beta(i)\sin\alpha(i) \\ r(i)\sin\beta(i) \end{bmatrix} \quad (3)$$

(Detection of White Line)

Figure 7:
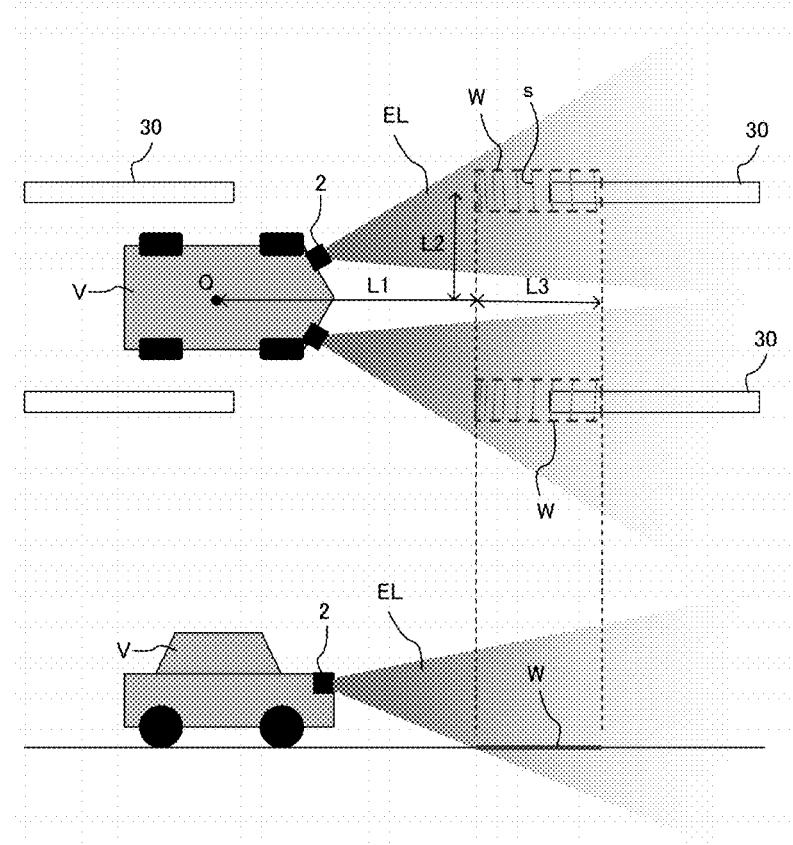
FIG. 7 is a diagram illustrating a method of detecting a white line by a lidar mounted on a vehicle.

FIG. 7 illustrates a method of detecting a white line by each of the lidars 2 mounted on the vehicle. The white line has high reflection intensity because a retroreflective material is applied. Accordingly, the onboard device 1 provides a window at a position where the white line on a road surface in front of the vehicle is easily detectable, and detects a portion having high reflection intensity in the window as the white line.

Specifically, as illustrated in FIG. 7, emission light EL is emitted toward the road surface in front of the vehicle from each of the lidars 2 provided on a front right side and a front left side of the vehicle. Virtual windows W are defined at predetermined positions in front of the vehicle. The positions of the windows W based on a center O of the vehicle are previously determined. Namely, a horizontal distance L1 from the center O of the vehicle to the windows W, a lateral-direction distance L2 from the center O of the vehicle to each of the right window W and the left window W, and a length L3 of each of the windows W is previously determined. The onboard device 1 extracts the scan data belonging to each of the windows W among the scan data output from the lidars 2. In a case where the reflection intensity of the scan data is larger than a predetermined threshold, the onboard device 1 determines that the white line has been detected.

(Line Interval)

Figure 8:
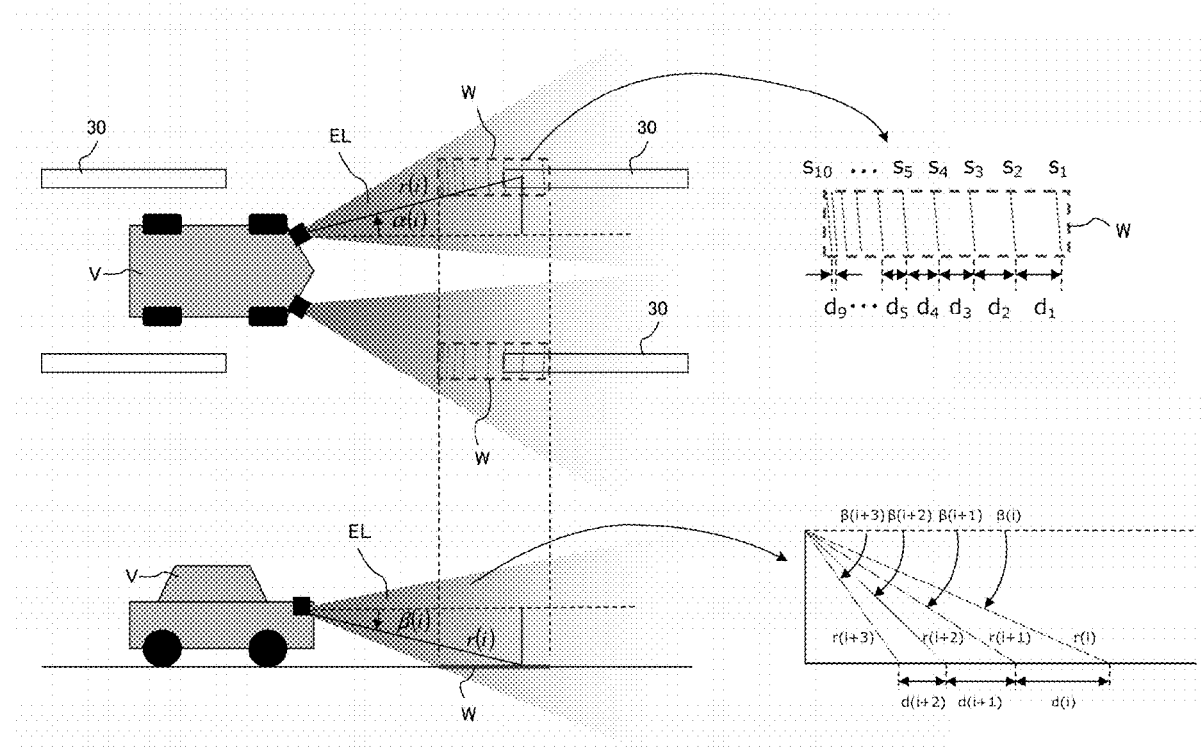
FIG. 8 is a diagram illustrating positions of a plurality of scan lines in a window.

When multilayer lidars are used as the lidars 2, a plurality of scan lines s are formed in each of the windows W. FIG. 8 illustrates positions of the plurality of scan lines s in each of the windows W. Intervals of the plurality of scan lines s (hereinafter, referred to as "line intervals") in each of the windows W are gradually increased as a distance from the vehicle is increased. An upper right part in FIG. 8 is a plane view of the scan lines in one window W as viewed from above. Scan lines $s_1$ to $s_{10}$ are formed in the window W, and line intervals $d_1$ to $d_9$ of the scan lines are illustrated. The line interval d of the scan line is increased as the distance from the vehicle is increased. A lower right part in FIG. 8 is a diagram of the scan lines in one window W as viewed from a side. Likewise, the line interval d of the scan line is increased as the distance from the vehicle is increased.

When a number of an arbitrary scan line is defined as "i", a horizontal angle of an i-th scan line is defined as α(i), a vertical angle is defined as β(i), and a distance from the vehicle is defined as r(i), a line interval d(i) between the i-th scan line and an (i+1)-th scan line is determined by the following expression (4). Likewise, a line interval d(i+1) between the (i+1)-th scan line and an (i+2)-th scan line is determined by the following expression (5), and a line interval d(i+2) between the (i+2)-th scan line and an (i+3)-th scan line is determined by the following expression (6).

$$d(i)=r(i)\cos\alpha(i)\cos\beta(i)-r(i+1)\cos\alpha(i+1)\cos\beta(i+1) \quad (4)$$

$$d(i+1)=r(i+1)\cos\alpha(i+1)\cos\beta(i+1)-r(i+2)\cos\alpha(i+2)\cos\beta(i+2) \quad (5)$$

$$d(i+2)=r(i+2)\cos\alpha(i+2)\cos\beta(i+2)-r(i+3)\cos\alpha(i+3)\cos\beta(i+2) \quad (6)$$

As described above, the line intervals d of the plurality of scan lines s in each of the windows W can be determined based on the scan data by the lidars 2.

(Measurement of End Point Position of White Line)

Next, a method of measuring an end point position of the white line by the lidar is described. FIG. 9 illustrates a method of measuring the position of the end point of a starting part of the white line (starting point of white line). In the window W, 10 scan lines $s_1$ to $s_{10}$ are formed. As described above, the onboard device 1 detects the white line based on the reflection intensity of the scan data obtained by the lidar. It is now assumed that the reflection intensity of the scan data is changed between the scan lines $s_2$ and $s_3$ as illustrated in the example 1. Namely, the reflection intensity of the scan line $s_2$ is larger than or equal to a predetermined threshold, and the reflection intensity of the scan line $s_3$ is smaller than the predetermined threshold. In this case, it is known that the end point of the white line exists between the scan lines $s_2$ and $s_3$, but the accurate position of the end point of the white line is not known. Accordingly, the onboard device 1 regards a middle point between the scan lines $s_2$ and $s_3$ as the end point of the white line.

Likewise, in a case where the reflection intensity of the scan data is changed between the scan lines $s_4$ and $s_5$ as illustrated in the example 2, the onboard device 1 regards a middle point between the scan lines $s_4$ and $s_5$ as the end point of the white line. In a case where the reflection intensity of the scan data is changed between the scan lines $s_7$ and $s_8$ as illustrated in the example 3, the onboard device 1 regards a middle point between the scan lines $s_7$ and $s_8$ as the end point of the white line.

A method of detecting an end point of a termination part of the white line is basically similar. FIG. 10 illustrates a method of measuring a position of the end point of the termination part of the white line (termination point of white line). It is assumed that the reflection intensity of the scan data is changed between the scan lines $s_2$ and $s_3$ as illustrated in the example 4. Namely, the reflection intensity of the scan line $s_2$ is smaller than the predetermined threshold, and the reflection intensity of the scan line $s_3$ is larger than or equal to the predetermined threshold. In this case, the onboard device 1 regards the middle point between the scan lines $s_2$ and $s_3$ as the end point of the white line.

Likewise, in a case where the reflection intensity of the scan data is changed between the scan lines $s_4$ and $s_5$ as illustrated in the example 5, the onboard device 1 regards the middle point between the scan lines $s_4$ and $s_5$ as the end point of the white line. Further, in a case where the reflection intensity of the scan data is changed between the scan lines $s_7$ and $s_8$ as illustrated in the example 6, the onboard device 1 regards the middle point between the scan lines $s_7$ and $s_8$ as the end point of the white line.

In a case where the reflection intensity of the scan data is changed between the i-th scan line $s_i$ and the (i+1)-th scan line $s_{i+1}$, a measurement value $L_x(t)$ of the lidar that indicates the position of the end point of the white line in the traveling direction of the vehicle is calculated by the following expression with use of a position $r_x(i)$ of the i-th scan line $s_i$ and a position $r_x(i+1)$ of the (i+1)-th scan line $s_{i+1}$ in the traveling direction of the vehicle.

$$L_x(t) = \frac{r_x(i) + r_x(i+1)}{2} \tag{7}$$

The measurement value of the white line by each of the lidars 2 is given by the following expression.

$$Z(t) = \begin{bmatrix} L_x(t) \\ L_y(t) \end{bmatrix} \tag{8}$$

Note that, the examples of FIG. 9 and FIG. 10 illustrate the case where one scan line can be detected as a set of scan data having equivalent reflection intensity. However, there is a case where the reflection intensity of the scan data is changed in a middle of one scan line. In this case, it is difficult to distinguish whether the scan line corresponds to the end point position of the white line or the scan line does not correspond to the end point position of the white line but the scan line has been detected as the end point due to stains, blur, or the like.

FIG. 11 illustrates an example in which the reflection intensity of the scan data is changed in the middle of the scan line. In the example 7 and the example 8, the reflection intensity of the scan data is changed in the middle of the scan line $s_3$. Therefore, it is difficult to determine that the scan line $s_3$ is the end point of the white line. Accordingly, in the case where the reflection intensity of the scan data is changed in the middle of the scan line, the onboard device 1 regards a middle point between the scan line correctly detected as the white line and a scan line not detected as the white line at all, as the end point position of the white line. In the example 7 in FIG. 11, the onboard device 1 regards a middle point between the scan line $s_2$ correctly detected as the white line and the scan line $s_4$ not detected as the white line at all, as the end point position of the white line. Likewise, in the example 8, the onboard device 1 regards a middle point between the scan line $s_4$ correctly detected as the white line and the scan line $s_2$ not detected as the white line at all, as the end point position of the white line.

In a case where the reflection intensity of the scan data is changed in the middle of the i-th scan line $s_i$ that is located between an (i−1)-th scan line $s_{i−1}$ and the (i+1)-th scan line $s_{i+1}$, the measurement value $L_x(t)$ of the lidar that indicates the position of the end point of the white line in the traveling direction of the vehicle is calculated by the following expression (9) with use of a position $r_x(i−1)$ of the (i−1)-th scan line $s_{i−1}$ and the position $r_x(i+1)$ of the (i+1)-th scan line $s_{i+1}$ in the traveling direction of the vehicle. In addition, the line interval d(t) at that time is calculated by an expression (10).

$$L_x(t) = \frac{r_x(i-1) + r_x(i+1)}{2} \tag{9}$$

$$d(t) = r(i-1)\cos\alpha(i-1)\cos\beta(i-1) - r(i+1)\cos\alpha(i+1)\cos\beta(i+1) \tag{10}$$

As described above, in the case where the end point of the white point can be detected, the measurement value $L_x(t)$ in the traveling direction of the vehicle has a value derived from the expression (7) or the expression (9). In a case where the end point of the white line cannot be detected, the measurement value $L_x(t)$ in the traveling direction of the vehicle is absent. On the other hand, a measurement value $L_y(t)$ in the lateral direction of the vehicle is an average value of center points of the plurality of scan lines detected in the window W. As a result, the measurement value of the white line by the lidar can be determined based on the detection result of the white line.

(2) Own-Vehicle Position Estimation Method

Next, an own-vehicle position estimation method according to the present embodiment is described.

(Calculation of Landmark Prediction Value)

Figure 12:
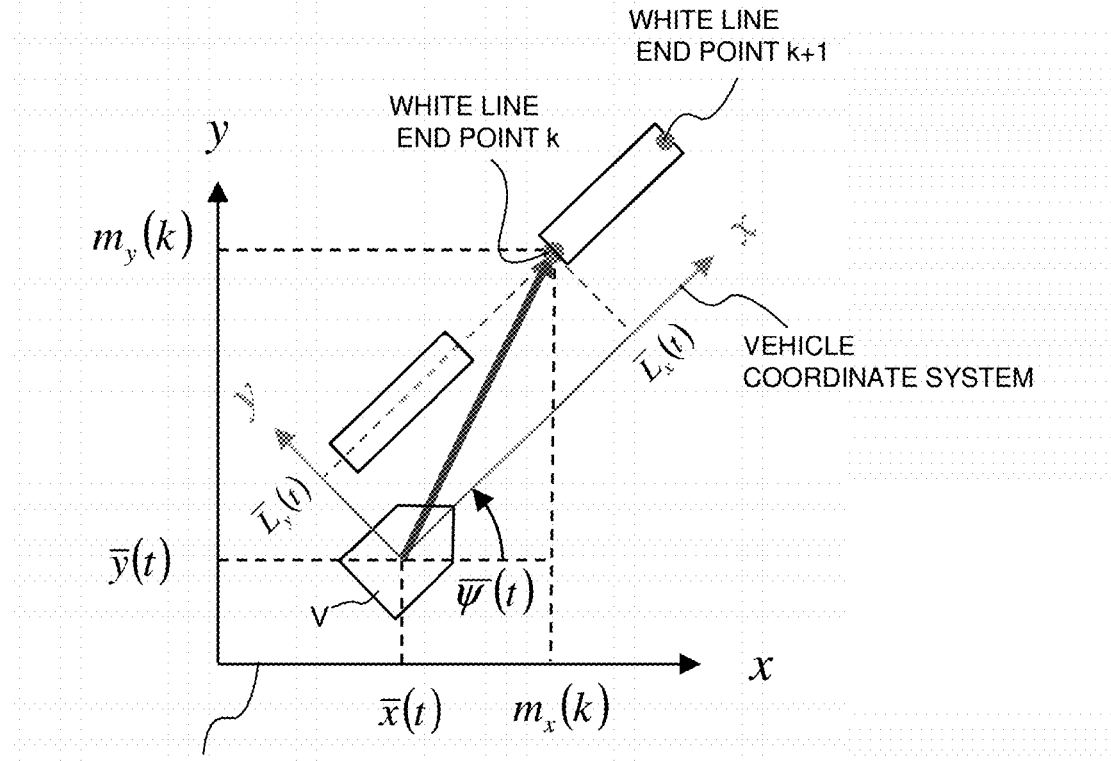
FIG. 12 is a diagram illustrating a method of calculating a landmark prediction value of the end point of the white line.

First, a method of calculating a landmark prediction value of the end point of the white line by using the map data is described. FIG. 12 illustrates the method of calculating the landmark prediction value of the end point of the white line. In FIG. 12, a vehicle V exists in a world coordinate system, and a vehicle coordinate system is defined with a center of the vehicle V as an origin. Coordinates ($m_x(k)$, $m_y(k)$) of a white line end point k are stored in the map DB 10. The coordinates of the white line end point k stored in the map DB 10 are coordinates in the world coordinate system, and the onboard device 1 converts the coordinates to coordinates in the vehicle coordinate system. Specifically, when coordinates of an estimated own-vehicle position of the vehicle V are $\bar{x}(t)$ and $\bar{y}(t)$, and an estimated own-vehicle azimuth is $\bar{\Psi}(t)$, the landmark prediction value of the white line end point k is expressed by the following expression with use of a rotation matrix that converts the coordinate in the world coordinate system to the coordinates in the vehicle coordinate system.

$$\bar{Z}(t) = \begin{bmatrix} \bar{L}_x(t) \\ \bar{L}_y(t) \end{bmatrix} = \begin{bmatrix} \cos\bar{\psi}(t) & \sin\bar{\psi}(t) \\ -\sin\bar{\psi}(t) & \cos\bar{\psi}(t) \end{bmatrix} \begin{bmatrix} m_x(k) - \bar{x}(t) \\ m_y(k) - \bar{y}(t) \end{bmatrix} = \begin{bmatrix} \{m_x(k) - \bar{x}(t)\}\cos\bar{\psi}(t) + \{m_y(k) - \bar{y}(t)\}\sin\bar{\psi}(t) \\ -\{m_x(k) - \bar{x}(t)\}\sin\bar{\psi}(t) + \{m_y(k) - \bar{y}(t)\}\cos\bar{\psi}(t) \end{bmatrix} \tag{11}$$

(Correction of Kalman Gain)

Next, a method of correcting the Kalman gain based on a detection state of the end point of the white line is described. FIG. 13A illustrates correction coefficients of the Kalman gain in the case where the onboard device 1 detects the end point of the white line. As the landmark measurement value used in the own-vehicle position estimation, there are a measurement value in the traveling direction of the vehicle and a measurement value in the lateral direction of the vehicle. Therefore, the correction coefficient in the traveling direction of the vehicle is defined as a traveling-direction correction coefficient a(t), and a correction coefficient in the lateral direction of the vehicle is defined as a lateral-direction coefficient b(t).

In a case where the onboard device 1 detects the end point of the white line in the window W, the onboard device 1 uses the position of the end point of the white line as the measurement value in the traveling direction. However, as described above, since the measurement value of the end point position of the white line is determined as the middle point between the two adjacent scan lines before and after the change in the reflection intensity, the measurement accuracy in the traveling direction of the vehicle is varied depending on the line interval of the scan lines. Namely, the error is large when the line interval is wide, and the error is small when the line interval is narrow. Accordingly, the Kalman gain in the traveling direction is corrected using the length of the line interval of the scan lines. Specifically, an inverse number of the line interval d(t) is defined as the traveling-direction coefficient a(t). Namely, the traveling-direction coefficient a(t) is set as follows, $a(t)=1/d(t)$.

In the case where the end point of the white line is detected, measurement accuracy of the end point position of the white line is higher as the line interval is narrower. Therefore, correction to increase the Kalman gain is performed.

As the measurement value in the lateral direction of the vehicle, the average value of the center points of the plurality of scan lines detected in the window W is used. In the case where the end point of the white line is detected in the window W, when the number of scan lines existing in the window W is defined as $N_M$, and the number of scan lines measured on the white line by the lidar is defined as $N_L$ as illustrated in FIG. 13A, the lateral-direction coefficient b(t) is set as follows, $b(t)=N_L(t)/N_M$.

In the case where the end point of the white line is detected, measurement accuracy in the lateral direction of the vehicle is higher as the number of scan lines detected on the white line is larger. Therefore, correction to increase the Kalman gain is performed.

FIG. 13B illustrates the correction coefficients of the Kalman gain in a case where the onboard device 1 detects the white line but the onboard device 1 does not detect the end point of the white line. In the case where the onboard device 1 does not detect the white line, the measurement value in the traveling direction of the vehicle cannot be obtained. Therefore, the traveling-direction coefficient a(t) is set as follows, $a(t)=0$.

Further, in the case where the onboard device 1 does not detect the end point of the white line, the center points of all of the scan lines in the window W can be measured and the measurement accuracy in the lateral direction of the vehicle is high. Therefore, the lateral-direction coefficient b(t) is set as follows, $b(t)=1$.

The own-vehicle position estimation unit 17 uses the traveling-direction coefficient a(t) and the lateral-direction coefficient b(t) obtained in the above-described manner to correct the Kalman gain. Specifically, the own-vehicle position estimation unit 17 multiplies the Kalman gain K(t) expressed in the following expression (12) by the traveling-direction coefficient a(t) and the lateral-direction coefficient b(t), thereby to generate an adaptive Kalman gain K(t)' expressed in an expression (13).

$$K(t) = \bar{P}(t)H(t)^T\{H(t)\bar{P}(t)H(t)^T + R(t)\}^{-1} \quad (12)$$

$$K(t)' = [a(t) \times k_1(t) \; b(t) \times k_2(t)] = \begin{bmatrix} a(t)k_{11}(t) & b(t)k_{12}(t) \\ a(t)k_{21}(t) & b(t)k_{22}(t) \\ a(t)k_{31}(t) & b(t)k_{32}(t) \end{bmatrix} \quad (13)$$

Thereafter, the own-vehicle position estimation unit 17 applies the obtained adaptive Kalman gain K(t)' to the Kalman gain K(t) in the expression (2), and calculates an estimated own-vehicle position X^(t) by the following expression (14).

$$\hat{X}(t)=\bar{X}(t)+K(t)'\{Z(t)-\bar{Z}(t)\} \quad (14)$$

(Correction of Measurement Noise)

Next, a method of correcting measurement noise based on the detection state of the end point of the white line is described. FIG. 14A illustrates correction coefficients of the measurement noise in the case where the onboard device 1 detects the end point of the white line. As the landmark measurement value used in the own-vehicle position estimation, there are the measurement value in the traveling direction of the vehicle and the measurement value in the lateral direction of the vehicle. Therefore, the correction coefficient in the traveling direction of the vehicle is defined as the traveling-direction correction coefficient a(t), and the correction coefficient in the lateral direction of the vehicle is defined as the lateral-direction coefficient b(t).

In the case where the onboard device 1 detects the end point of the white line in the window W, the onboard device 1 uses the position of the end point of the white line as the measurement value in the traveling direction. However, as described above, since the measurement value of the end point position of the white line is determined as the middle point between the two adjacent scan lines before and after the change in the reflection intensity, the measurement accuracy in the traveling direction of the vehicle is varied depending on the line interval of the scan lines. Namely, the error is large when the line interval is wide, and the error is small when the line interval is narrow. Accordingly, the measurement noise in the traveling direction is corrected using the length of the line interval of the scan lines. Specifically, a ratio of the line interval d(t) and the shortest line interval (line interval $d_9$ in FIG. 9) among the plurality of detected line intervals is defined as the traveling-direction coefficient a(t). Namely, the traveling-direction coefficient a(t) is set as follows, $a(t)=d(t)/d_9$.

In the case where the end point of the white line is detected, the measurement accuracy of the end point position of the white line is higher as the line interval is narrower. Therefore, correction to reduce the measurement noise is performed.

As the measurement value in the lateral direction of the vehicle, the average value of the center points of the plurality of scan lines detected in the window W is used. In the case where the end point of the white line is detected in the window W, when the number of scan lines existing in the window W is defined as $N_M$, and the number of scan lines measured on the white line by the lidar is defined as $N_L$ as illustrated in FIG. 14A, the lateral-direction coefficient b(t) is set as follows, $$b(t)=N_M/N_L(t).$$

In the case where the end point of the white line is detected, measurement accuracy in the lateral direction of the vehicle is higher as the number of scan lines detected on the white line is larger. Therefore, correction to reduce the measurement noise is performed.

FIG. 14B illustrates the correction coefficients of the measurement noise in the case where the onboard device 1 detects the white line but the onboard device 1 does not detect the end point of the white line. In the case where the onboard device 1 does not detect the white line, the measurement value in the traveling direction of the vehicle cannot be obtained. Therefore, a large value is set as the traveling-direction coefficient a(t). For example, the traveling-direction coefficient a(t) is set as follows, $$a(t)=10000.$$

Further, in the case where the onboard device 1 does not detect the end point of the white line, the center points of all of the scan lines in the window W can be measured and the measurement accuracy in the lateral direction of the vehicle is high. Therefore, the lateral-direction coefficient b(t) is set as follows, $$b(t)=1.$$

The own-vehicle position estimation unit 17 multiplies the measurement noise by the traveling-direction coefficient a(t) and the lateral-direction coefficient b(t) obtained in the above-described manner, thereby to generate adaptive measurement noise. Further, the own-vehicle position estimation unit 17 uses the adaptive measurement noise to determine the estimated own-vehicle position.

Specifically, basic measurement noise R(t) is derived from the following expression. Note that, with respect to the white line measurement as a target, $\sigma_{Lx}^2$ is measurement noise in the traveling direction in the vehicle coordinate system, and $\sigma_{Ly}^2$ is measurement noise in the lateral direction in the vehicle coordinate system.

$$R(t) = \begin{bmatrix} \sigma_{Lx}^2 & 0 \\ 0 & \sigma_{Ly}^2 \end{bmatrix} \quad (15)$$

Accordingly, the own-vehicle position estimation unit 17 multiplies the measurement noise by the traveling-direction coefficient a(t) and the lateral-direction coefficient b(t) to obtain the following adaptive measurement noise R(t)'.

$$R(t)' = \begin{bmatrix} a(t)\sigma_{Lx}^2 & 0 \\ 0 & b(t)\sigma_{Ly}^2 \end{bmatrix} \quad (16)$$

Further, the own-vehicle position estimation unit 17 substitutes the adaptive measurement noise R(t)' into the expression (12) for the Kalman gain, to obtain the following adaptive Kalman gain K(t)'.

$$K(t)'=\overline{P}(t)H(t)^T\{H(t)\overline{P}(t)H(t)^T+R(t)'\}^{-1} \quad (17)$$

Thereafter, the own-vehicle position estimation unit 17 applies the obtained adaptive Kalman gain K(t)' to the Kalman gain K(t) in the expression (2), and calculates the estimated own-vehicle position X^(t) from the expression (14).

As a result, the position estimation in the traveling direction can be performed using the end point information on the dashed line, and the suitable processing based on the detection state of the white line can be performed by the processing using the adaptive measurement noise corresponding to the detection accuracy of the end point of the white line and the number of the detected lines.

(3) Own-Vehicle Position Estimation Processing

Figure 15:
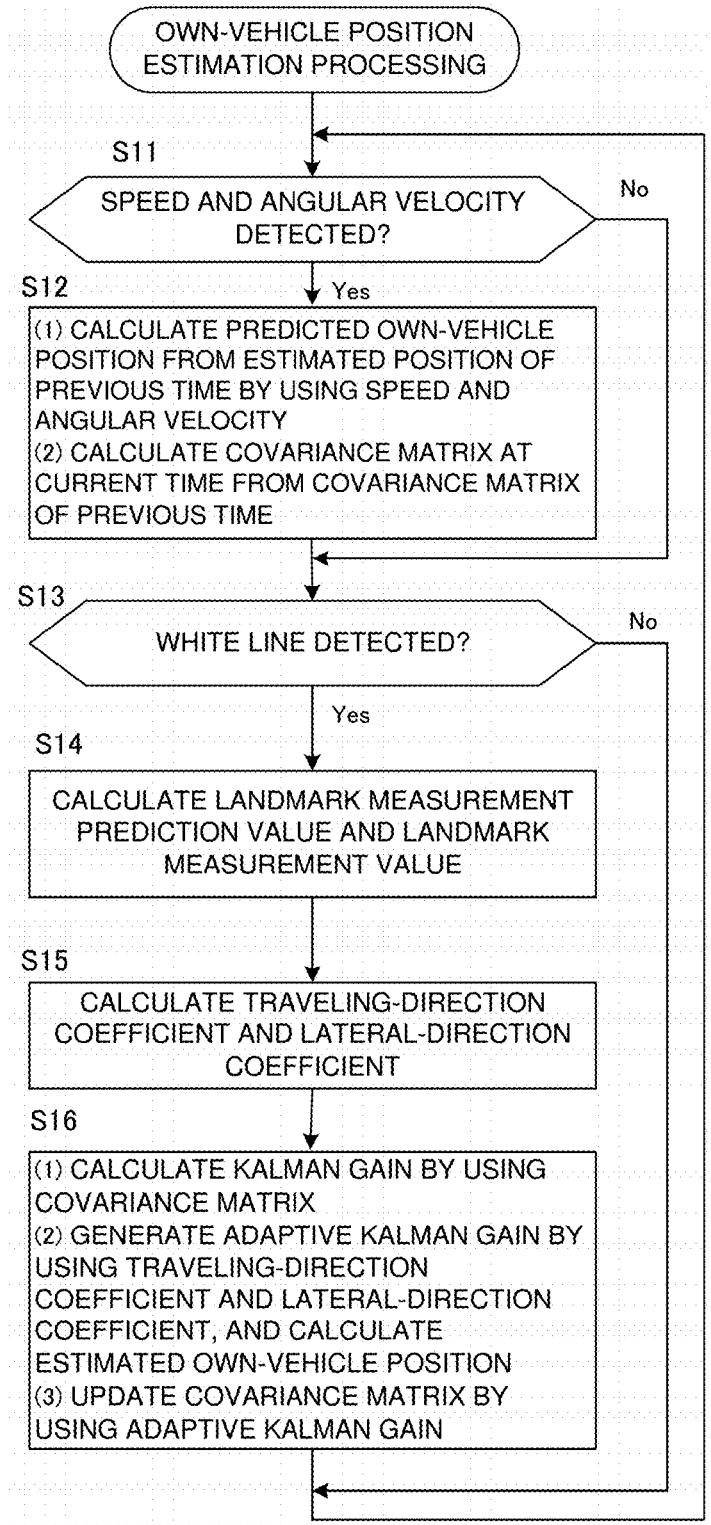
FIG. 15 is a flowchart of an own-vehicle position estimation processing.

FIG. 15 is a flowchart of the own-vehicle position estimation processing performed by the own-vehicle position estimation unit 17. The own-vehicle position estimation unit 17 repeatedly performs the processing in the flowchart of FIG. 15.

First, the own-vehicle position estimation unit 17 determines whether a vehicle body speed and an angular velocity in a yaw direction of the vehicle have been detected (step S11). For example, the own-vehicle position estimation unit 17 detects the vehicle body speed based on the output of the vehicle speed sensor 4, and detects the angular velocity in the yaw direction based on the output of the gyro sensor 3. In a case where the vehicle body speed and the angular velocity in the yaw direction of the vehicle have been detected (step S11: Yes), the own-vehicle position estimation unit 17 uses the detected vehicle body speed and the detected angular velocity to calculate the predicted own-vehicle position X⁻(t) from the estimated own-vehicle position X^(t−1) of the previous time. Further, the own-vehicle position estimation unit 17 calculates the covariance matrix at the current time from the covariance matrix of the previous time (step S12). Note that, in the case where the vehicle body speed and the angular velocity in the yaw direction of the vehicle have not been detected (step S11: No), the own-vehicle position estimation unit 17 uses the estimated own-vehicle position X^(t−1) of the previous time as the predicted own-vehicle position X−(t), and uses the covariance matrix of the previous time as the covariance matrix at the current time.

Next, the own-vehicle position estimation unit 17 determines whether the white lines have been detected as the landmark used in the own-vehicle position estimation (step S13). Specifically, the own-vehicle position estimation unit 17 sets the windows W as illustrated in FIG. 7, and determines whether the white lines have been detected in the windows W based on the reflection intensity of the scan data by the lidars 2. In a case where the white lines have not been detected (step S13: No), the own-vehicle position estimation using the white lines cannot be performed. Therefore, the processing ends.

In contrast, in a case where the white lines have been detected (step S13: Yes), the own-vehicle position estimation unit calculates the landmark prediction values of the white lines based on the map data in the map DB 10, and calculates the landmark measurement values of the white lines by the lidars 2 (step S14). Specifically, the own-vehicle position estimation unit 17 converts the coordinates of the end points of the white lines included in the map data into coordinates in the vehicle coordinate system, and calculates the landmark prediction value of the end points of the white lines. In addition, the own-vehicle position estimation unit 17 uses the measurement values of the white lines by the lidars as the landmark measurement values.

Further, as described with reference to FIG. 13 and FIG. 14, the own-vehicle position estimation unit 17 calculates the traveling-direction coefficient a(t) and the lateral-direction coefficient b(t) based on whether the end points of the white lines have been detected (step S15).

Thereafter, the own-vehicle position estimation unit 17 uses the covariance matrix to calculate the Kalman gain K(t) based on the above-described expression (10), uses the traveling-direction coefficient a(t) and the lateral-direction coefficient b(t) to generate the adaptive Kalman gain K(t)' expressed in the expression (13) or (17), and calculates the estimated own-vehicle position from the expression (14). Moreover, the own-vehicle position estimation unit 17 uses the adaptive Kalman gain K(t)' to update the covariance matrix as expressed by the following expression (18) (step S16).

$$P(t) = \overline{P}(t) - K(t)'H(t)\overline{P}(t) \quad (18)$$

As described above, in the case where the end points of the white lines can be detected, the own-vehicle position estimation unit 17 performs the own-vehicle position estimation processing based on the Kalman filter by using the end points of the white lines as the landmarks. Further, the own-vehicle position estimation unit 17 calculates the traveling-direction coefficient and corrects the Kalman gain based on the line interval of the scan lines by each of the lidars 2 when the end points of the white lines are detected. This makes it possible to perform the own-vehicle position estimation with high accuracy in the traveling direction of the vehicle.

[Modification]

In the above-described embodiment, the windows W are provided on the right and left positions in front of the vehicle, and the onboard device 1 detects the white lines in the windows W. In a case where a pair of lidars 2 is provided on a rear part of the vehicle, the windows W may be provided on the right and left positions on a rear side of the vehicle to detect the white lines.

BRIEF DESCRIPTION OF REFERENCE NUMBERS

1 Onboard device
2 Lidar
3 Gyro sensor
4 Vehicle speed sensor
5 GPS receiver
10 Map DB

The invention claimed is:

1. A self-position estimation device mounted on a mobile body comprising:
an acquisition unit configured to acquire a predicted position of the mobile body;
a difference value calculation unit configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and
an estimation unit configured to estimate a self-position of the mobile body by correcting the predicted position of the mobile body with a value obtained by multiplying the difference value by a coefficient,
wherein the estimation unit corrects the coefficient based on an interval of scanning positions of the measurement unit at a position where the end point of the lane division line is detected.

2. The self-position estimation device according to claim 1, wherein the estimation unit corrects the coefficient with an inverse number of the interval of the scanning positions.

3. The self-position estimation device according to claim 1, wherein the estimation unit corrects the coefficient based on a ratio of the interval of the scanning positions and a shortest interval of the scanning positions measured by the measurement unit among intervals of the scanning positions.

4. The self-position estimation device according to claim 1,
wherein the measurement unit detects a lane division line existing in a window that is defined at a predetermined position with a position of the mobile body as a reference, and
wherein the estimation unit corrects the coefficient based on a ratio of number of scan lines existing on the lane division line and number of scan lines previously determined based on a size of the window.

5. The self-position estimation device according to claim 1, wherein the measurement unit detects a middle point between a scan line existing on the lane division line and a scan line not existing on the lane division line as the end point of the lane division line, the scan line existing on the lane division line and the scan line not existing on the lane division line being adjacent to each other.

6. The self-position estimation device according to claim 1, wherein the coefficient is a Kalman gain.

7. A self-position estimation method performed by a self-position estimation device mounted on a mobile body, the method comprising:
an acquisition process configured to acquire a predicted position of the mobile body;
a difference value calculation process configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and
an estimation process configured to estimate a self-position of the mobile body by correcting the predicted position of the mobile body with a value obtained by multiplying the difference value by a coefficient,
wherein the estimation process corrects the coefficient based on an interval of scanning positions of the measurement unit at a position where the end point of the lane division line is detected.

8. A non-transitory computer-readable medium storing a program executed by a self-position estimation device that is mounted on a mobile body and includes a computer, the program causing the computer to function as:

an acquisition unit configured to acquire a predicted position of the mobile body;
a difference value calculation unit configured to calculate a difference value between a predicted position of an end point of a lane division line and a measured position of the end point of the lane division line, the predicted position being obtained based on information on the end point of the lane division line acquired from map information, the measured position being measured by a measurement unit which is mounted on the mobile body and which measures the measured position by performing scanning with a light in a predetermined direction; and
an estimation unit configured to estimate a self-position of the mobile body by correcting the predicted position of the mobile body with a value obtained by multiplying the difference value by a coefficient,
wherein the estimation unit corrects the coefficient based on an interval of scanning positions of the measurement unit at a position where the end point of the lane division line is detected.

\* \* \* \* \*